United States Patent [19]
Azuma et al.

[11] 4,212,838
[45] Jul. 15, 1980

[54] PROCESS FOR MANUFACTURE OF CANTILEVER FOR PICKUP CARTRIDGE

[75] Inventors: Koichi Azuma, Osaka; Masahiro Nagasawa, Hirakata; Hiroshi Yamazoe, Katano; Masaki Aoki, Hirakata, all of Japan

[73] Assignee: Matsushita Electric Industrial Co., Ltd., Osaka, Japan

[21] Appl. No.: 941,908

[22] Filed: Sep. 13, 1978

[30] Foreign Application Priority Data

Sep. 20, 1977 [JP] Japan .................................. 52-113520
Sep. 20, 1977 [JP] Japan .................................. 52-113521

[51] Int. Cl.² .......................... C23C 13/04; C23C 11/00
[52] U.S. Cl. ........................................... 264/25; 264/81
[58] Field of Search ........................... 264/81, 25, 39; 427/248 A, 248 B, 255; 428/36

[56] References Cited

U.S. PATENT DOCUMENTS

| 3,549,424 | 12/1970 | Rice | 427/248 A X |
| 3,811,917 | 5/1974 | Diefendorf | 427/248 A X |
| 3,985,917 | 10/1976 | Krukonis | 427/248 A X |

*Primary Examiner*—James R. Hoffman
*Attorney, Agent, or Firm*—Burgess, Ryan and Wayne

[57] ABSTRACT

A cantilever for a pickup cartridge comprising a base in the form of a solid rod or a pipe coated with a layer of a substance exhibiting a high modulus of elasticity ratio higher than 5000 Kg/mm². The substance is for example boron or a boride. Described also is a process for manufacture of cantilevers wherein low pressure chemical vapor deposition or plasma chemical vapor deposition is used to cause the reaction between boron trichloride ($BCl_3$) and hydrogen ($H_2$) gases, thereby depositing boron or a boride on a base.

5 Claims, 17 Drawing Figures

FIG. 2
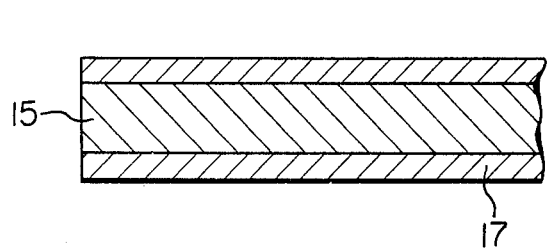
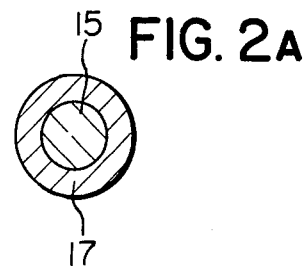
FIG. 2A
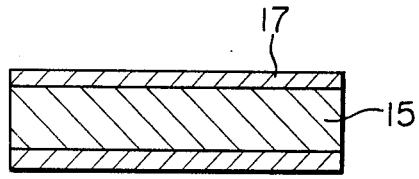
FIG. 3A
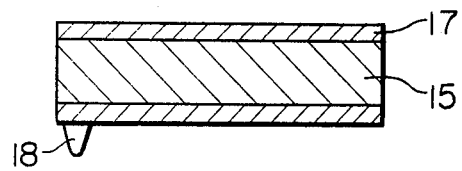
FIG. 3B
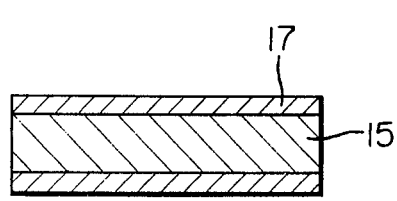
FIG. 4A
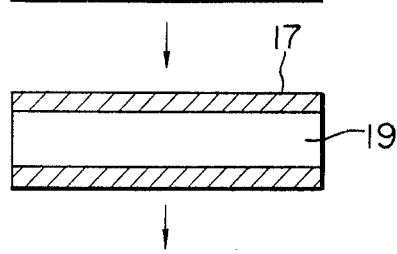
FIG. 4B
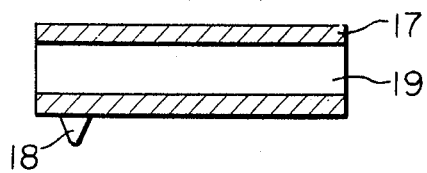
FIG. 4C

FIG. 6
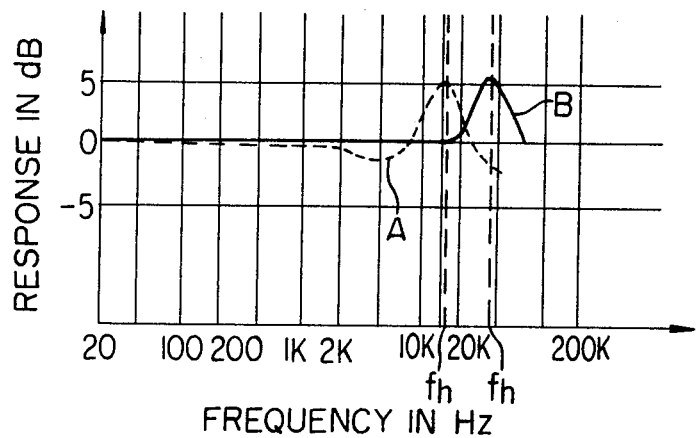
FIG. 8  FIG. 8A
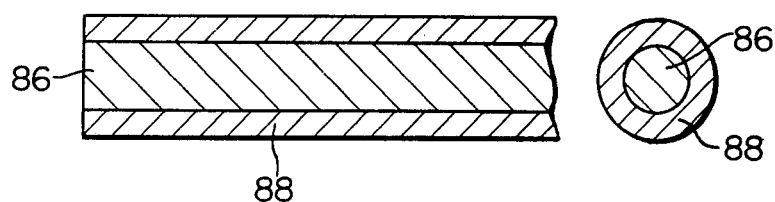
FIG. 9
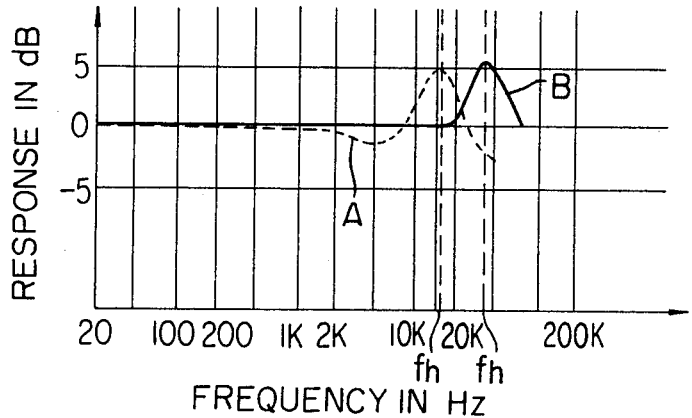

PROCESS FOR MANUFACTURE OF CANTILEVER FOR PICKUP CARTRIDGE

BACKGROUND OF THE INVENTION

The present invention relates to a cantilever for a pickup cartridge used in a sound recording-reproducing system and a process for manufacture thereof.

In general, the cantilevers for pickup cartridges must be light in weight in order to reduce the effective mass viewed from the tip of a stylus and must be also strong and rigid so as to avoid divide vibrations. To these ends extensive stuides and experiments have been made.

A prior art cantilever for a pickup cartridge is made of a pipe of an aluminum alloy. In order to obtain required strength, the pipe must have a large diameter and a thick wall and consequently is very heavy, so that the effective mass of a vibrator is increased. In order to solve these problems, there has been proposed to use a pipe made of titanium because the latter has excellent mechanical strength so that both the diameter and wall thickness may be reduced and consequently the weight may be reduced. However, even with the titanium pipe sufficient strength and rigidity cannot be attained.

In order to attach a stylus tip, one end of a cantilever is pressed flat, a hole is formed through the flattened portion and the stylus tip is forcibly fitted into this hole. In this case, the cantilever is annealed so that the decrease in strength and rigidity results. In order to solve this problem, the cantilever with the stylus tip is subjected to the oxidation process, but satisfactory strength and rigidity still cannot be attained because the oxidation process results in the increase in rigidity and Young's modulus only by 10%. Furthermore the control of oxidation of the cantilever is difficult and in the extreme case the cantilever becomes brittle.

Because of these unsatisfactory cantilevers, the conventional pickup cartridges exhibit the so-called drooping phenomenon. That is, their frequency response drops in the range between 2 and 10 KHz below the high resonance frequency $f_0$ (which is in general between 10 and 40 KHz). Thus the flat frequency response curve cannot be obtained. Furthermore their transition characteristics which determine the degree of trackability are not satisfactory.

SUMMARY OF THE INVENTION

In order to overcome the above problems, the inventor made extensive studies and experiments of the processes for coating a metal pipe with a layer of boron. A successful process was filed for patent (Japanese Patent Application No. 53452/1976). Furthermore the inventor filed another application (Japanese Patent Application No. 58287/1977) which discloses a pipe-shaped cantilever made solely of boron.

The present invention relates to improvements of the above process and cantilever. A significant feature of the present invention resides in the fact that the so-called plasma chemical vapor deposition technique or low pressure chemical vapor deposition is utilized in order to cause the chemical reaction between boron trichloride and hydrogen so as to form a layer of boron or a boride over a cantilever base. Thus the cantilevers exhibiting a high modulus of elasticity ratio may be easily manufactured.

One of the objects of the present invention is therefore to provide a cantilever for a pickup cartridge which has high mechanical strength and rigidity so that the frequency and transition characteristics of the pickup cartridge may be substantially improved.

BRIEF DESCRIPTION OF THE DRAWINGS

FIG. 2 is a longitudinal sectional view of a cantilever proper fabricated with the apparatus shown in FIG. 1;

Figure 7:
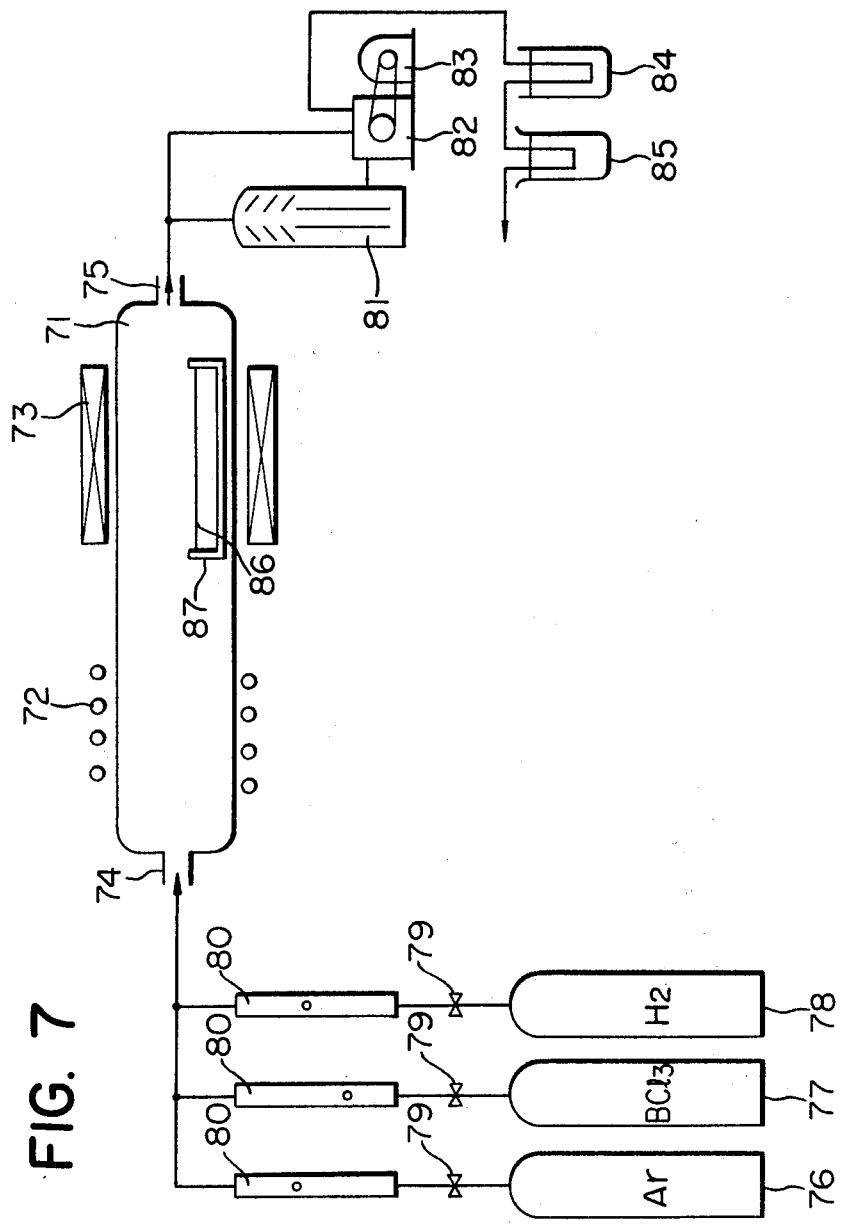

(A) and (B) in FIG. 3 and (A), (B) and (C) in FIG. 4 show the steps of forming a cantilever;

(A) to (D) in FIG. 5 show the steps for embedding a diamond tip into a cantilever proper;

FIG. 6 shows the frequency characteristic curves of a prior art pickup cartridge and a pickup cartridge with a cantilever in accordance with the present invention;

FIG. 7 is a diagrammatic view of a plasma chemical vapor deposition apparatus used for carrying out the process of manufacture of cantilevers in accordance with the present invention;

FIG. 8 is a longitudinal sectional view of a cantilever produced by the apparatus shown in FIG. 7; and FIG. 9 shows the frequency characteristic curves of a prior art pickup cartridge and a pickup cartridge with a cantilever produced by the apparatus shown in FIG. 7.

DESCRIPTION OF THE PREFERRED EMBODIMENTS

Figure 1:
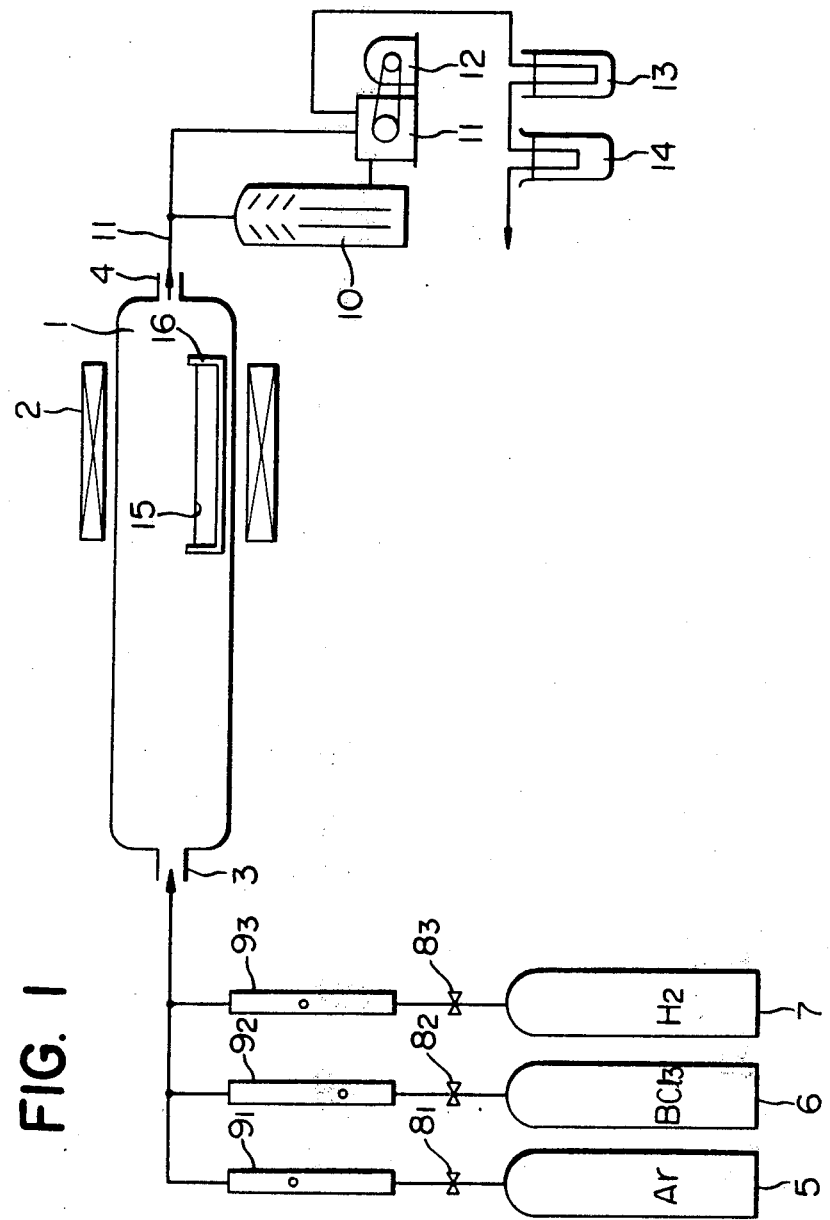
FIG. 1 is a diagramatic view of a low pressure chemical vapor deposition apparatus used for carrying out one example of the process for manufacture of cantilevers in accordance with the present invention.
Figure 5A:
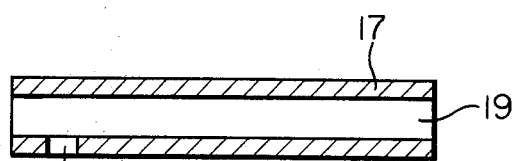
Figure 5B:
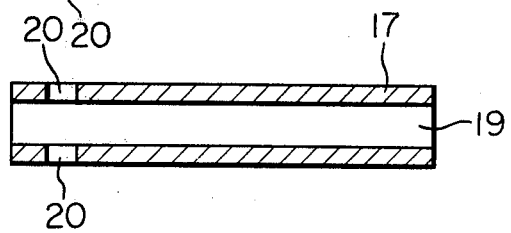
Figure 5C:
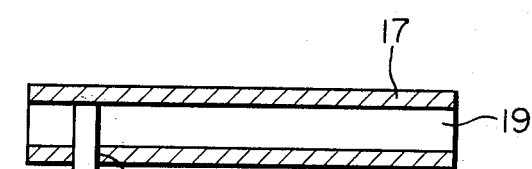
Figure 5D:
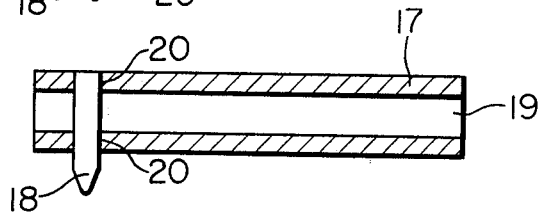

FIG. 1 shows diagrammatically a low pressure chemical deposition apparatus comprising a hollow quartz reaction furnace tube 1 with an inlet port 3 and an outlet port 4, a high frequency power source 2 of 400 KHz for heating the atmosphere in the reaction furnace tube 1, an argon gas storage 5 for supplying argon gas which is a carrier gas, a boron trichloride storage 6 for supplying boron trichloride gas which is decomposed into boron and a hydrogen gas storage 7. These storages 5, 6 and 7 are connected through needle valves $8_1$, $8_2$ and $8_3$ and flow meters $9_1$, $9_2$ and $9_3$ to the inlet port 3 of the reaction furnace tube 1 so that a mixture of argon, boron trichloride and hydrogen at a desired ratio may be fed into the reaction furnace tube 1. The apparatus further includes an oil diffusion pump 10 and an oil rotary pump 12 not only for cleaning the reaction furnace tube 1 by burning the impurities therein prior to producing plasma but also for evacuating the reaction furnace tube 1 so as to produce plasma. The rotary pump 11 is driven by a motor 12. The discharge port of the rotary pump 11 is communicated with first and second traps filled with liquefied nitrogen for trapping toxic gases contained in the exhaust gases from the reaction furnace tube 1.

Next referring further to FIG. 2, the steps for production of a cantilever will be described. A boat 16 with an aluminum wire 15 of an outer diameter of 0.3 mm is placed in the reaction furnace tube 1 and then the inlet port 3 is closed. (In practice, a valve not shown and connected in series to the inlet port is closed.) The pumps 11 and 12 are driven to evacuate the reaction furnace tube 1 to 0.1 to 10 Torr. Thereafter the inlet port 3 (or the valve) is opened so as to admit the mixture of argon, boron trichloride and hydrogen into the reaction furnace tube 1. The ratio between boron trichloride and hydrogen is 1:10. Argon gas is charged into the reaction furnace tube 1 in order to adjust the concentration of the gas mixture in the reaction furnace tube 1 so that required chemical reactions may proceed. After the gas mixture has been admitted into the reaction furnace tube 1, the high-frequency source 2 is energized to heat the gas mixture in the reaction furnace tube 1 to about 500° C. Then, under a reduced pressure the following chemical reaction proceeds $$2BCl_3 + 3H_2 \rightarrow 2B + 6HCl$$

That is, boron which is a cantilever base or substrate is deposited on the aluminum wire 15.

As shown in FIG. 6, the aluminum wire 15 is coated with a layer of boron 17 in uniform thickness. The remaining boron trichloride and HCl are toxic, so that they are absorbed in the liquid nitrogen in the traps 13 and 14 so as to avoid atmospheric pollution.

Instead of the aluminum wire, wire of titanium, tantalum or molybdenum may be used. With these wires, the reaction temperature is about 1000° C.

The semi-product thus obtained is cut into a suitable length with a diamond cutter or the like as shown by (A) in FIG. 3 and a diamond stylus 18 is securely attached, whereby a finished cantilever is provided as shown by (B) in FIG. 3.

Instead of the solid cantilever shown by (B) in FIG. 3, a hollow cantilever may be provided as will be described below with reference to FIG. 4. After the semifinished cantilever has been cut into a suitable length with a diamond cutter or the like as shown by (A) in FIG. 4, it is subjected to the chemical etching with an acidic or alkali etchant such as HCl so as to remove the base 15. Thus, the hollow cantilever proper 19 consisting only of boron is provided as shown by (B) in FIG. 4. Thereafter a diamond stylus 18 is securely bonded or embedded as shown by (C) in FIG. 4. Thus the hollow cantilever is provided.

In order to embed a tip 18 into the pipe-like cantilever proper, a tip insertion hole or holes 20 are formed by the laser beam machining or the electric-discharge machining as shown by (A) or (B) in FIG. 5. Thereafter the tip 18 is inserted through the hole or holes 20 and embedded in the cantilever proper 19 as shown by (C) or (D) in FIG. 5.

As compared with the prior art cantilevers made of aluminum, titanium, beryllium, titanium boride or the like, the cantilever in accordance with the present invention exhibits an excellent modulus of elasticity ratio $E/\rho$ as shown in TABLE I below.

TABLE I

| Materials | Modulus of elasticity E ($Kg/mm^2$) | Density $\rho$ | Modulus of elasticity ratio $E/\rho$ ($Kg/mm^2$) |
|---|---|---|---|
| Al | 7400 | 2.69 | 2750 |
| Ti | 11000 | 4.54 | 2420 |
| Be | 28000 | 1.84 | 15200 |
| $TiB_2$ | 66200 | 4.50 | 14710 |
| B | 45000 | 2.30 | 19560 |

FIG. 6 shows the frequency characteristic curve A of a prior art pickup cartridge incorporating a cantilever solely made of aluminum or titanium and the frequency response curve B of a cartridge with a pipe-shaped boron cantilever in accordance with the present invention. It can be seen that the curve A droops slightly from 5 to 10 KHz and the resonance frequency is as low as 20 KHz. On the other hand, the curve B is flat and the resonance frequency is as high as about 40 KHz.

Thus, in the audible range the curve B is substantially flat.

Instead of the aluminum wire, titanium, tantalum, tungsten, molybdenum, copper, carbon, glass and quartz wires may be used. In order to remove the base or wire, any suitable etching methods such as electrolytic etching may be used. Instead of boron trichloride, any suitable halides of boron capable of reacting with hydrogen so as to produce boron may be used.

When titanium tetrachloride is added as a boride the following chemical reaction takes place $$2BCl_3 + TiCl_4 + 5H_2 \rightarrow TiB_2 + 10HCl$$

Titanium boride is produced.

As described above, according to the present invention, boron or titanium boride is deposited on the cantilever base or wire under a reduced pressure so that the deposition rate of boron or titanium boride may be easily controlled as compared with the chemical vapor deposition under the atmospheric pressure. Furthermore the solid or hollow cantilever thus provided exhibits a very high modulus of elasticity ratio so that the frequency and other characteristics may be remarkably improved.

FIG. 7 shows a plasma chemical vapor deposition apparatus comprising a quartz reaction furnace tube 71 with an inlet port 74 and an outlet port 75, a high frequency source 72 for generating the high frequency signal of 13.56 MHz, thereby producing plasma in the reaction furnace tube 71, another high frequency source 73 of 400 KHz for heating the atmosphere within the reaction furnace tube 71, an argon gas source 76, a boron trichloride source 77 and a hydrogen source 78. These sources are connected through needle valves $79_1$, $79_2$ and $79_3$ and flow meters $80_1$, $80_2$ and $80_3$ to the inlet port 74 of the reaction furnace tube 71 so that the mixture of boron trichloride and hydrogen at the ratio of 1:10 may be admitted into the reaction furnace tube 71. Argon gas is introduced into the reaction furnace tube 71 so as to adjust the cncentration of the gas mixture within the reaction furnace tube 71 in order to establish plasma therein.

The apparatus further includes an oil diffusion pump 81 and an oil rotary pump 82 driven by a motor 83 and traps 84 and 85, their functions being same with those of the diffusion pump 10, the rotary pump 12 and the traps 13 and 14 described elsewhere with reference to FIG. 1.

Next the mode of operation will be described with further reference to FIG. 8. An aluminum wire 86 of an outer diameter 0.3 mm is extended over a boat 87 which in turn is placed into the reaction furnace tube 71.

Prior to the admission of the gas mixture consisting of boron trichloride and hydrogen is admitted into the reaction furnace tube 71, the latter is evacuated to 0.1 to 10 Torr. After the gas mixture has been introduced into the reaction furnace tube 71, both the high frequency sources 72 and 73 are energized so that the gas mixture in the reaction furnace tube 71 may be heated to about 500° C. and the high frequency field may be produced. Then both boron trichloride and hydrogen gases are ionized into positive ions and electrons so that high-energy plasma is created. High energy positive ions cause the deposition of boron on an aluminum wire 76 which is the base of a cantilever. The process of plasma chemical vapor deposition for deposition of boron has not been clarified yet so that no further description thereof shall be made in this specification.

As shown in FIG. 8, the aluminum wire 86 is coated with a boron layer 88 in uniform thickness. The remaining boron trichloride and hydrochloric acid are toxic so that they are trapped in the traps 84 and 85 so as to avoid the atmospheric pollution problem.

Instead of the aluminum wire, titanium wire, tantalum wire, molybdenum wire and so on may be used. With these wires, the reaction temperature is about 1000° C.

The steps for providing a pickup cantilever by attaching or embedding a diamond tip has been described in detail elsewhere with reference to FIGS. 3–5.

As compared with the prior art cantilevers made of aluminum, titanium, berylium and titanium boride, the thus obtained cantilever of the present invention exhibits excellent modulus of elasticity E and modulus of elasticity ratio $E/\rho$ as shown in TABLE II below.

TABLE II

| Materials | Modulus of elasticity E (Kg/mm$^2$) | Density $\rho$ | Modulus of elasticity ratio E/$\rho$ (Kg/mm$^2$) |
|---|---|---|---|
| Al | 7400 | 2.69 | 2750 |
| Ti | 11000 | 4.54 | 2420 |
| Be | 28000 | 1.84 | 15200 |
| TiB$_2$ | 66200 | 4.50 | 14710 |
| B | 45000 | 2.30 | 19560 |

The pickup cartridge with the cantilever in accordance with the present invention also exhibits the excellent frequency characteristic curve B as shown in FIG. 9 as compared with the frequency characteristic curve A of a prior art pickup cartridge.

As described above, with plasma chemical vapor deposition boron is caused to deposit on a base or wire under the high energies of positive ions so that the boron layer is very hard, very strong and very rigid. Thus cracking of the cantilever hardly occurs. Furthermore materials with a relatively low melting point may be used as a base or wire, and the methods in accordance with the present invention are adapted for the mass production of cantilevers so that the pickup cartridges may be manufactured at less cost. In addition, the frequency and other characteristics may be remarkably improved.

What is claimed is:

1. A process for manufacture of cantilevers for pickup cartridges which comprises providing a base in the form of a solid rod or a pipe from a material which may be chemically or electrolytically etched, forming by vapor deposition a layer of a substance exhibiting a modulus of elasticity ratio higher than 5000 Kg/mm$^2$ on said base, said substance being boron or a boride, and removing said base.

2. A process for manufacture of cantilevers for pickup cartridges as set forth in claim 1 wherein
said base is made of one of aluminum, titanium, tantalum, tungsten, molybdenum, copper, carbon, quartz and glass.

3. A process for manufacture of cantilevers for pickup cartridges as set forth in claim 1 in which said layer of a substance on said base is formed by low pressure chemical vapor deposition.

4. A process for manufacture of cantilevers for pickup cartridges as set forth in claim 1 in which said layer of a substance on said base is formed by plasma chemical vapor deposition.

5. A process for manufacture of cantilevers for pickup cartridges as set forth in claim 1, wherein said layer comprises boron or titanium boride formed by deposition from a gas comprising a boron compound.

* * * * *